March 2, 1971  R. E. BROOKS  3,567,324
METHOD FOR MEASURING GAS TURBULENCE OVER LONG PATHS
Filed Jan. 16, 1968  2 Sheets-Sheet 2
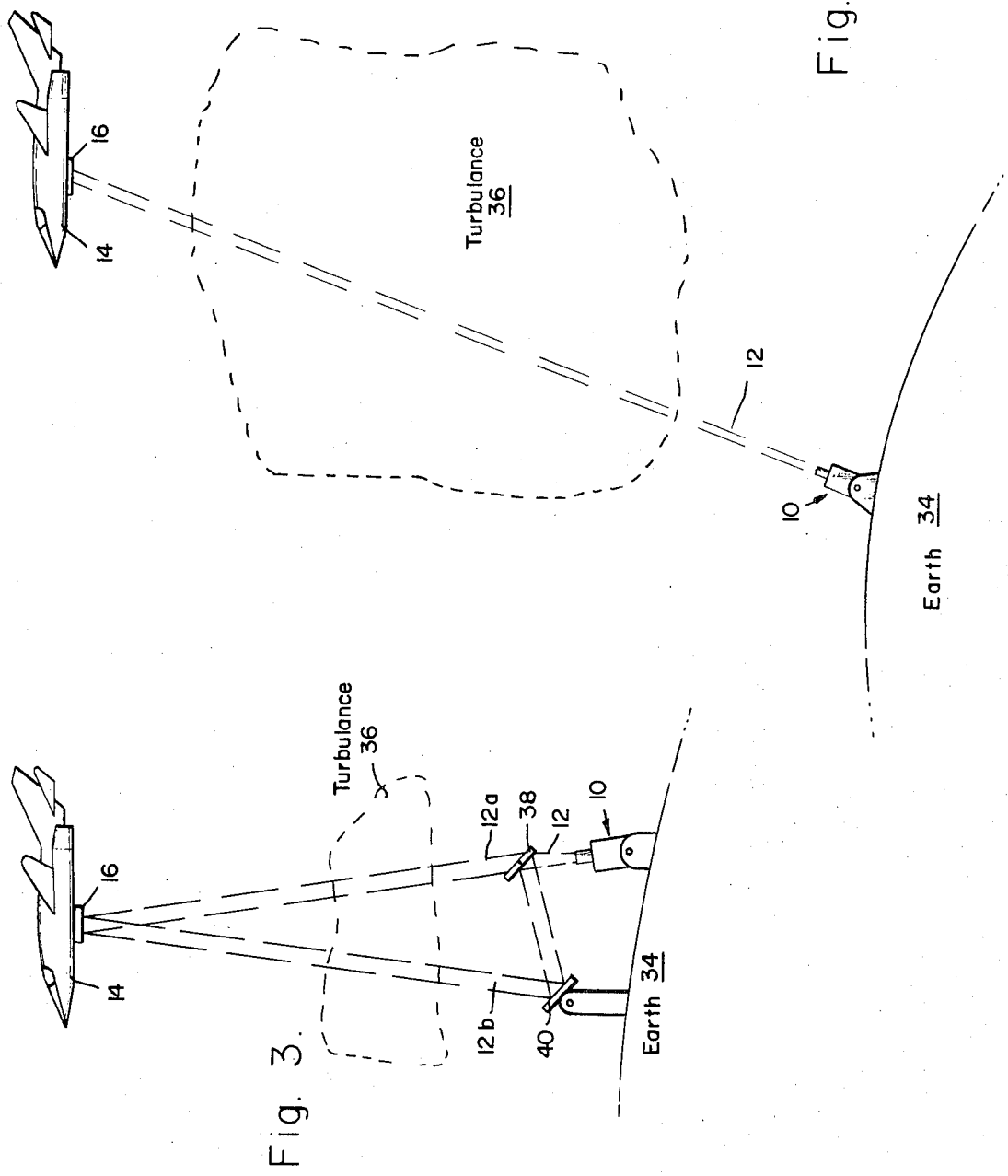
Robert E. Brooks,
INVENTOR.
BY.
Edward Dugas
ATTORNEY.

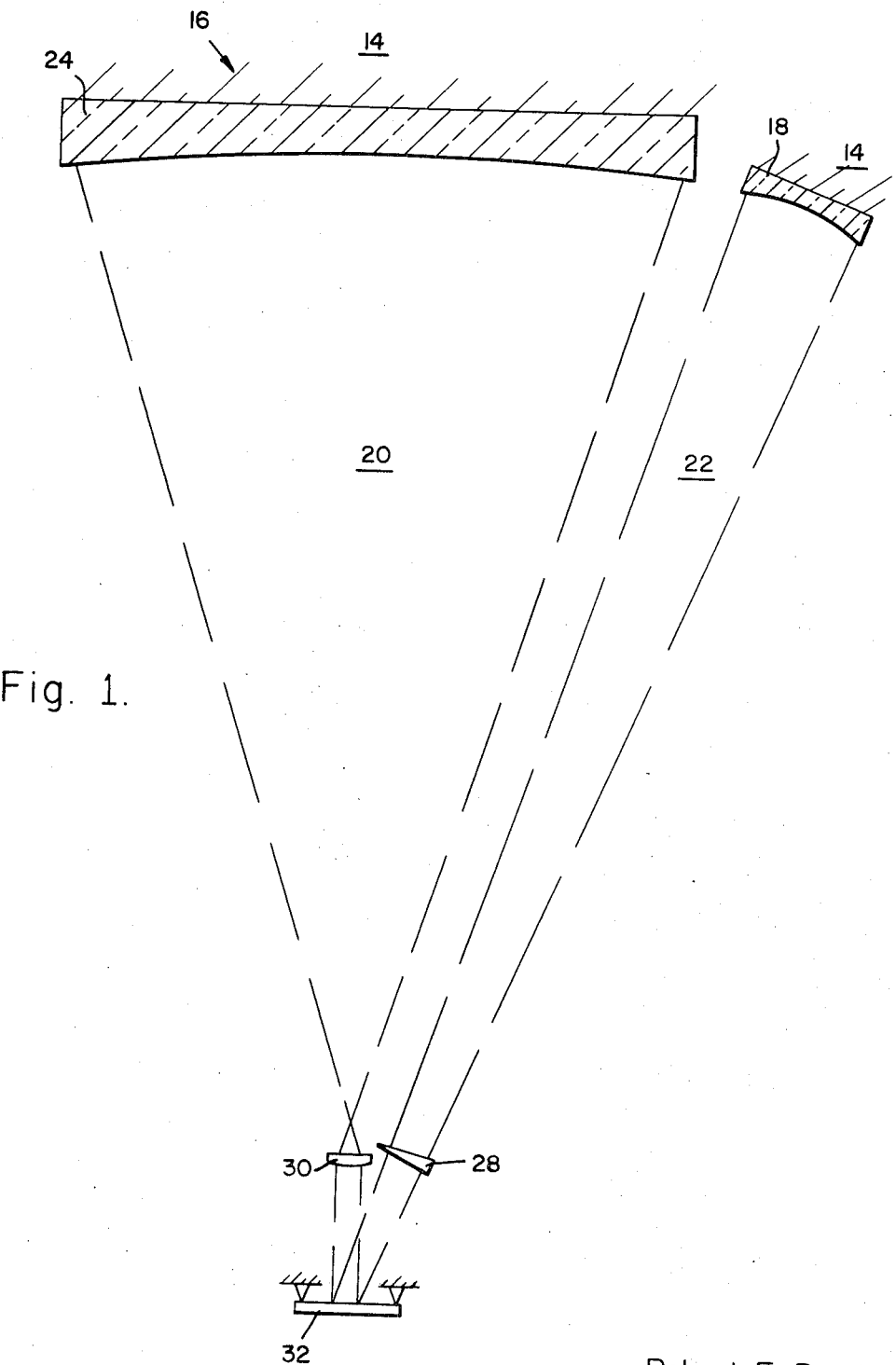

United States Patent Office 3,567,324
Patented Mar. 2, 1971

3,567,324
METHOD FOR MEASURING GAS TURBULENCE
OVER LONG PATHS
Robert E. Brooks, Redondo Beach, Calif., assignor to
TRW Inc., Redondo Beach, Calif.
Filed Jan. 16, 1968, Ser. No. 698,321
Int. Cl. G01b 9/02; G02b
U.S. Cl. 356—107
3 Claims

ABSTRACT OF THE DISCLOSURE

The method of this invention measures the optical phase distortions in light due to its passage through turbulent air. The measurements are made by flying an aircraft above or through the turbulence. A ground station directs a laser beam to the aircraft, whereon is mounted a pair of concave reflectors that intercept the laser light and direct it in the form of two beams, to intersect on a photographic plate. The plate is double exposed to the beams to create a differential interferogram. The plate is then developed. The interference pattern containing information about the phase distortions of the turbulent air is created by directing a beam of laser light onto the photographic plate.

BACKGROUND OF THE INVENTION

Various devices exist in the prior art for solving the problem of clear air turbulence detection. One of these devices, for example, detects the moisture content in the air and attempts to find a correlation between this content and the turbulence of the air. Another known detector detects the $CO_2$ level in the air and from this level a determination of the turbulence is attempted. The method of this particular invention borrows upon the art of holography and applies this art to detect and measure changes in the density (turbulence) of the air.

SUMMARY OF THE INVENTION

The method of this invention consists of first directing a beam of coherent light through the air in which turbulence is to be detected and, second, placing an optical means such as a pair of reflectors to receive and reflect the coherent beam after its passage through the turbulence. The reflectors are positioned to direct the reflected beams to intersect at a radiation sensitive means such as a photographic plate and, thirdly, exposing the photographic plate at least twice to the reflected beams and developing the photographic plate to provide an interferogram of the air turbulence.

In the preferred method of this invention, one exposure of the photographic plate is made with the turbulence removed from the path of the coherent beam. In applications where this is not possible and wherein the turbulence recorded in each exposure is statistically independent, the interference pattern observed corresponds to the difference in the phase distortions during the two exposures. From the differential interferogram, the phase characteristics of the atmosphere can be inferred.

Accordingly, it is an object of the present invention to provide an improved method for determining air turbulence.

It is a further object of the present invention to provide a method, utilizing a holographic apparatus, for detecting clear air turbulence.

The aforementioned and other objects of the present invention will become more apparent when taken in conjunction with the following description and drawings, throughout which like characters indicate like parts, and which drawings form a part of this application.

BRIEF DESCRIPTION OF THE DRAWINGS

FIG. 1 illustrates in schematic form an apparatus which may be utilized with the method of this invention;

FIG. 2 illustrates the relative position of apparatus used in carrying out the method of this invention; and FIG. 3 illustrates additional apparatus which may be used with the method of this invention.

BRIEF DESCRIPTION OF THE PREFERRED EMBODIMENT

Referring to FIGS. 1 and 2, numeral 10 designates a laser pulse generator capable of generating a beam of pulsed radiant energy 12. The pulse generator 10 is shown positioned on the earth 34. The beam of pulsed radiant energy 12 is directed to an aircraft frame 14 through a turbulent mass of air 36, the presence of which is to be detected. Optical means 16, affixed to the aircraft frame 14, reflects and divides beam 12 into two beams 20 and 22. The optical means also directs beams 20 and 22 to intersect in the region of a recording plate 32 which may be a photographic plate. Optical means 16 is comprised in part of a pair of concave reflectors 24 and 18, which are positioned to receive the pulsed radiant energy beam 12 and to reflect and divide the beam 12 into two beams 20 and 22, each of which converges toward the other. Reflector 24 focuses the beam 20 and passes the focused beam to collimating lens 30 to intersect on the surface of a photographic plate 32. Beam 22 is angularly deflected by means of prism 28 which redirects beam 22 to intersect beam 20 at the surface of the photographic plate 32 to cause an interference pattern to be formed on the plate. To form a holographic type interference on the photographic plate, using an imperfect laser source 10, it is necessary to maintain the optical path length of beams 20 and 22 substantially equal, that is, the beams must suffer substantially equal optical delay upon reaching the photographic plate 32. Because the angle between beams 20 and 22 can be made small, sensitive, low-resolution photographic films may be used, such as Eastman Kodak Plus-X or Tri-X Pan film.

In the apparatus shown, the diameter of the laser beam as it is emitted from the laser pulse generator 10 is approximately ½ inch in diameter and diverges angularly at a rate of approximately 2 to 10 milliradians, depending on the quality of the lasing rod material and laser configurations. With the aircraft positioned at an altitude of 100,000 feet, the diameter of the reflecting mirror 24 is approximately 10 feet. This diameter is dictated by the desire to examine a reasonably large area of the atmosphere. The mirror 18 is one foot in diameter, which is negligible in comparison to the diameter of mirror 24 and is thus negligibly affected by the atmospheric turbulence. The sensitive area of the photographic plate is approximately 2 inches by 2 inches, and in the embodiment shown, the photographic plate is positioned approximately 15 feet from the reflective surface of mirror 24. A Q-switched ruby laser which can provide 2 joules of power in a 10–15 nanosecond pulse with a one-pulse-per-second repetition rate will yield good results.

In operation, the aircraft 14 is flown over or through the turbulence to be measured, the laser beam 12 is directed toward the optical means 16 and the photographic plate is exposed by a pulse of light in the laser beam. This exposure of the plate produces a latent image which is a record of the interference pattern formed by the beams 20 and 22 after their passage through and partial diffraction by the turbulence 36. The optical means 16 is again pulsed and a second exposure of the plate occurs. Two records in the form of interference patterns setting forth two instants in the history of the turbulence 36 are imposed on the single photographic plate.

Depending on the time difference between successive pulses, it may be necessary to realign the laser beam 12 with the optical means 16. A means for redirecting the beam to track the aircraft is well known within the prior art and is not shown here for purposes of simplicity. Alignment need not be precise, for a slight misalignment results in a finite fringe pattern containing the desired information.

After the plate has been exposed twice, it is developed to yield an interferogram of the turbulence. A reconstruction of the interferogram can be obtained by redirecting a simulated beam 22 through the photographic plate 32 at approximately the same angle which the beam had with respect to the plate during the recording sequence.

Referring to FIG. 3, the pulsed laser beam 12 is divided into two beams 12a and 12b by the beam splitter 38. Beam 12b is directed towards the aircraft 14 by means of a reflector 40. The reflector 40, the laser pulse generator 10 and the beam splitter 38 are affixed to the earth 34. The optical means 16 affixed to the aircraft frame is identical to that disclosed in FIG. 1. In operation, the laser is pulsed, producing the beam 12. The beam 12 splits at the beam splitter into the two beams 12a and 12b. Beam 12a passes through the turbulence 36 and is received at the optical means 16. Beam 12b is deflected to the mirror 40 and therefore traverses a spatially separate path than beam 12a to the optical means 16. The turbulence in the path of beam 12b is statistically independent from that of beam 12a. The plate 32 is thereby exposed to two beams 12a and 12b, each of which have passed through the turbulence 36 at different places. A differential interference pattern of the turbulence is thus recorded on the plate 32. Development of the plate and viewing of the plate as previously discussed will yield information as to turbulence that was present in the beam paths. It is not necessary that paths 12a and 12b have exactly the same optical path length and indeed, under certain circumstances, a slight mismatch may lead to superior results.

Several possible alternate modifications and variations of the present invention will be apparent to those skilled in the art. For example, a sequence of many recordings documenting successive changes in an object can be made. It would be possible by arranging the recordings to compare each recording and note the difference between successive recordings which would indicate the amount of turbulence.

While there has been shown what is considered to be the preferred method of the present invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. The method of detecting and measuring turbulence over a long path which comprises the steps of:
    generating coherent radiant energy;
    splitting said coherent energy into a first and a second beam of coherent energy;
    directing said first beam over a first path through an area of turbulence toward a predetermined plane;
    directing said second beam over a second path spaced from said first path through said area of turbulence and toward said predetermined plane;
    reflecting the major portion of the diameter of the cross-sectional area of each of said first and second beams toward said predetermined plane;
    separately reflecting the remaining small portion of the diameter of the cross-sectional area of each of said first and second beams toward said predetermined plane, said small portion of said cross-sectional diameter being so small that the disturbance of the wavefront of said small portion is negligible compared to that of said major portion, thereby to provide a distorted reference beam, and
    positioning a radiation-sensitive medium in said predetermined plane to create an interferogram capable of detecting and measuring the turbulence.

2. Apparatus for detecting and measuring gas turbulence comprising:
    a laser for generating a beam of coherent radiant energy;
    means for directing said laser beam through an area of gas turbulence;
    a first concave reflector positioned to intercept the major portion of the diameter of the cross-sectional area of the laser beam having passed through said area of turbulence and to direct it toward a predetermined plane;
    a radiation-sensitive medium positioned in said plane; and
    a second concave reflector positioned to intercept the small remaining portion of the cross-sectional diameter of the laser beam having passed through said area of turbulence, and to direct the distorted small portion of the beam toward said predetermined plane, the diameter of said second reflector being negligibly small compared to that of said first reflector, whereby said remaining portion of said laser beam serves as a distorted reference beam for said major portion of said laser beam.

3. Apparatus as defined in claim 2 wherein the diameter of said second reflector compared to that of said first reflector has approximately the ratio of one to ten.

References Cited
UNITED STATES PATENTS 3,415,587  12/1968  Cathey, Jr. _____ 350—3.5

OTHER REFERENCES

"Holographic Interferometry," Heflinger et al., Journal of Applied Physics, vol. 37, No. 2, February, 1966.

RONALD L. WIBERT, Primary Examiner

C. CLARK, Assistant Examiner

U.S. Cl. X.R.

350—3.5